July 7, 1936.  V. PANOFF  2,046,965
VERTICAL SHAFT MOTOR
Filed July 17, 1935
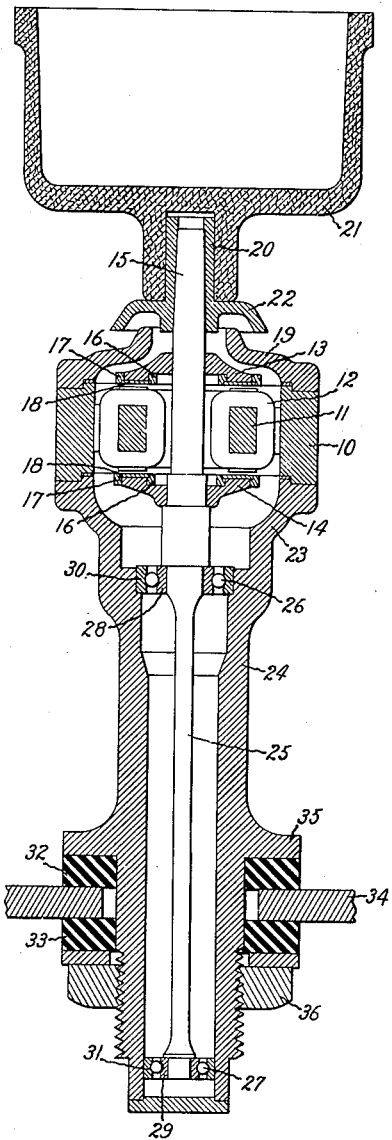
Inventor:
Vincent Panoff,
by Harry E. Dunham
His Attorney.

Patented July 7, 1936

2,046,965

UNITED STATES PATENT OFFICE 2,046,965

VERTICAL SHAFT MOTOR

Vincent Panoff, Belfort, France, assignor to General Electric Company, a corporation of New York Application July 17, 1935, Serial No. 31,930
In France July 27, 1934

6 Claims. (Cl. 117—27.6)

My invention relates to high speed vertical shaft motors.

Vertical shaft high speed motors are widely used in the textile industry for driving spinning spindles, rayon spinning buckets or the like, and since it is necessary for these motors to ordinarily operate well above the one or more critical speeds of the shaft, some provision is made for damping oscillations of the shaft as it passes through its critical speeds. Such spinning devices require that the shaft and the spinning device mounted thereon be very accurately balanced, as any substantial unbalance of these parts may give rise to resonance phenomena which may set up excessive vibrations of the motor shaft in passing through its critical speeds.

I have found that satisfactory operation can be obtained by constructing the motor shaft and mounting so that the rotating parts are permitted to rotate with their principal axis along the axis of rotation. Under this condition of rotation the unbalanced forces and displacing couples acting on the rotating device are eliminated. In order to obtain this condition, it is necessary that the shaft be sufficiently flexible to permit a certain amount of displacement from the axis of rotation and that suitable damping be provided to prevent the setting up of excessive vibrations when passing through its critical speeds. In order to damp these vibrations and to tend to return the rotating parts into the axis of rotation, I provide a motor shaft with a flexible portion mounted between bearings so that when the rotating parts tend to oscillate about the axis of rotation, the flexible portion of the shaft is bent, and the elastic reaction resulting therefrom tends to produce a centering force, limiting the amplitude of the oscillations of the shaft, and by resiliently mounting the casing in which the shaft bearings are mounted, the vibrations are dampened when passing through the critical speeds.

An object of my invention is to construct a motor of this type, such that the motor shaft and device driven thereby can pass through the critical speeds of the shaft even if the motor, shaft, and spinning devices are not accurately balanced. I accomplish this by providing a motor having a stator and a rotor cooperating therewith, mounted on a relatively rigid portion of a vertical shaft having a flexible portion extending from the rigid portion, which is supported by bearings adjacent each end of this flexible portion, and arranged to drive a spinning device on the rigid portion of the shaft.

My invention will be more fully set forth in the following description referring to the accompanying drawing, and the features of novelty which characterize my invention will be pointed out with particularity in the claims appended to and forming a part of this specification.

The single figure in the drawing is a vertical sectional view of a motor embodying my invention.

Referring to the drawing, I have shown a rayon spinning motor having a stationary member 10 and including a core structure 11 provided with suitable alternating current windings 12 and two disk type squirrel cage rotors 13 and 14 mounted on the rigid portion 15 of the motor shaft and arranged on opposite sides of the core structure 11. These squirrel cage rotors include inner and outer conducting rings 16 and 17 connected by radial conductor bars 18. This arrangement provides a substantially uniform air gap between the parallel stator and rotor faces and equalizes the axial magnetic forces exerted between the stator and rotor, thereby eliminating the end thrust which would be exerted upon the shaft by these forces. Under unbalanced conditions, oscillation of the rotating parts, resulting in deflection of the shaft, produces slight variations in the length of the air gap between the stator and the rotor, resulting in magnetic forces tending to equalize the length of the air gap and thus produces forces tending to dampen the vibrations of the shaft.

This motor is provided with an upper end shield 19 having an axial opening therein through which the upper end of the rigid portion 15 of the shaft extends, and an adaptor 20 is mounted on the tapered upper end of the shaft to support a removable rayon spinning bucket 21. The bucket adaptor 20 is provided with a downwardly extending flared skirt 22 extending about the upper end of the shield 19 to protect the motor from material that may be spilled out of the spinning bucket.

The lower end shield 23 of the motor is provided with an elongated cylindrical casing 24, which is resiliently supported so as to aid in damping out oscillations which might produce harmful vibrations. In order to support the rotor, the relatively rigid upper portion 15 of the shaft is constructed with a unitary vertical motor shaft is constructed with a portion 25 of reduced diameter, providing a lower flexible portion of reduced substantially uniform cross sectional area extending from the rigid upper portion, the lower portion being rotatably supported by ball bearings 26 and 27 mounted in the casing 24. The inner races 28 and 29 of the bearings 26 and 27, respectively, are tightly fitted on the shaft adjacent the ends of the flexible portion 25 of the shaft, and are constructed so as to provide for sufficient universal movement with respect to the outer races 30 and 31 to permit the desired deflection of the shaft within the casing 24. The outer races 30 and 31 are tightly fitted in the casing 24. This arrangement provides supports along the axis of the shaft between which deflections of the shaft may occur under the influence of unbalancing forces and produce resilient centering forces tending to limit the amplitude of the deflections of the shaft. In addition to the damping of vibrations when passing through critical speeds of the shaft by the magnetic forces due to a variable airgap between the rotor and the stationary member, further damping may be obtained by resiliently supporting the casing 24 by rings 32 and 33 of rubber, or the like, clamped to a spinning frame 34, or other suitable support, between a flange 35 and a nut 36 threaded on the casing. The opening in the spinning frame 34, through which the casing 24 extends, is formed larger than the casing, and the elastic properties of the rings 32 and 33 provide a resilient support permitting lateral displacement of the shaft, as well as pivotal oscillatory movement with respect to the spinning frame to permit the proper axial alignment of the rotating parts and the elimination of excessive vibrations when passing through critical speeds by damping effect produced by the internal friction in the rubber mounting. In this way accurate balancing of the parts of my improved motor and spinning device is unnecessary, so that considerable economy in its manufacture is effected. Furthermore, the spinning motor will operate satisfactorily with considerable unbalance of the spinning device or material in the bucket 21.

In the illustrated embodiment of my invention, I have constructed the flexible portion of the shaft on the side of the motor opposite from that on which the driven member is mounted, so that the spinning device may be mounted in close proximity to the rotor of the motor and thus the rigid portion of the shaft may be made relatively short. This proximity of the driven member and the rotor reduces to a minimum the inclination which the shaft will assume under the influence of an unbalanced rotating mass and thereby also aids in reducing the amplitude of the vibrations of the shaft.

While I have illustrated and described one embodiment of my invention, modifications thereof will occur to those skilled in the art. I desire it to be understood, therefore, that my invention is not to be limited to the particular arrangement disclosed and I intend, in the appended claims, to cover all modifications which do not depart from the spirit and scope of my invention.

What I claim as new and desire to secure by Letters Patent of the United States, is:

1. A motor comprising a unitary vertical shaft having a relatively rigid portion and a flexible portion extending from said rigid portion, bearings arranged adjacent each end of said flexible portion, a stationary member, a rotor arranged to cooperate with said stationary member and mounted on said shaft, means including a casing for rigidly mounting said stationary member and said bearings, and a spinning device mounted on said rigid portion of said shaft.

2. A motor comprising a vertical shaft having a relatively rigid portion and a flexible portion extending from said rigid portion, bearings arranged adjacent each end of said flexible portion, a stationary member, a rotor mounted on said rigid portion of said shaft and arranged to cooperate with said stationary member, means including a casing for rigidly mounting said stationary member and said bearings, means for resiliently supporting said casing, and a spinning device mounted on said rigid portion of said shaft.

3. A spinning motor comprising a vertical shaft having a rigid upper portion and a flexible lower portion, a stationary member provided with a field exciting winding, a rotor mounted on said rigid upper portion of said shaft and arranged to cooperate with said stationary member, bearings mounted on said stationary member and supporting each end of said flexible portion of said shaft, and a spinning device mounted on said rigid portion of said shaft.

4. A motor comprising a vertical shaft having a relatively rigid portion and a flexible portion of substantially uniform cross sectional area and of a smaller diameter than said rigid portion and extending from said rigid portion, means including bearings arranged adjacent each end of said flexible portion for supporting said shaft, a stationary member, and a rotor and driven member mounted on said rigid portion of said shaft.

5. A spinning motor comprising a vertical shaft having a rigid upper portion and a flexible lower portion, a stationary member, bearings arranged adjacent each end of said flexible portion of said shaft, means including a rotor mounted on said rigid portion of said shaft and arranged to cooperate with said stationary member, and a spinning device mounted on said rigid portion of said shaft.

6. A motor comprising a unitary vertical shaft having a relatively rigid portion and a portion of reduced cross section to provide a flexible extension of said rigid portion, bearings arranged to support each end of said flexible extension, said motor having a stationary member and a rotatable member carried by said shaft, means including a casing for rigidly mounting said stationary member and said bearings, a support, means including annuluses of resilient material secured to said support for resiliently supporting said casing, and a spinning device mounted on said rigid portion of said shaft.

VINCENT PANOFF.